E. G. JAY, Jr.
METHOD OF SETTING METERS AND MEANS THEREFOR.
APPLICATION FILED AUG. 4, 1917.
1,271,901. Patented July 9, 1918.
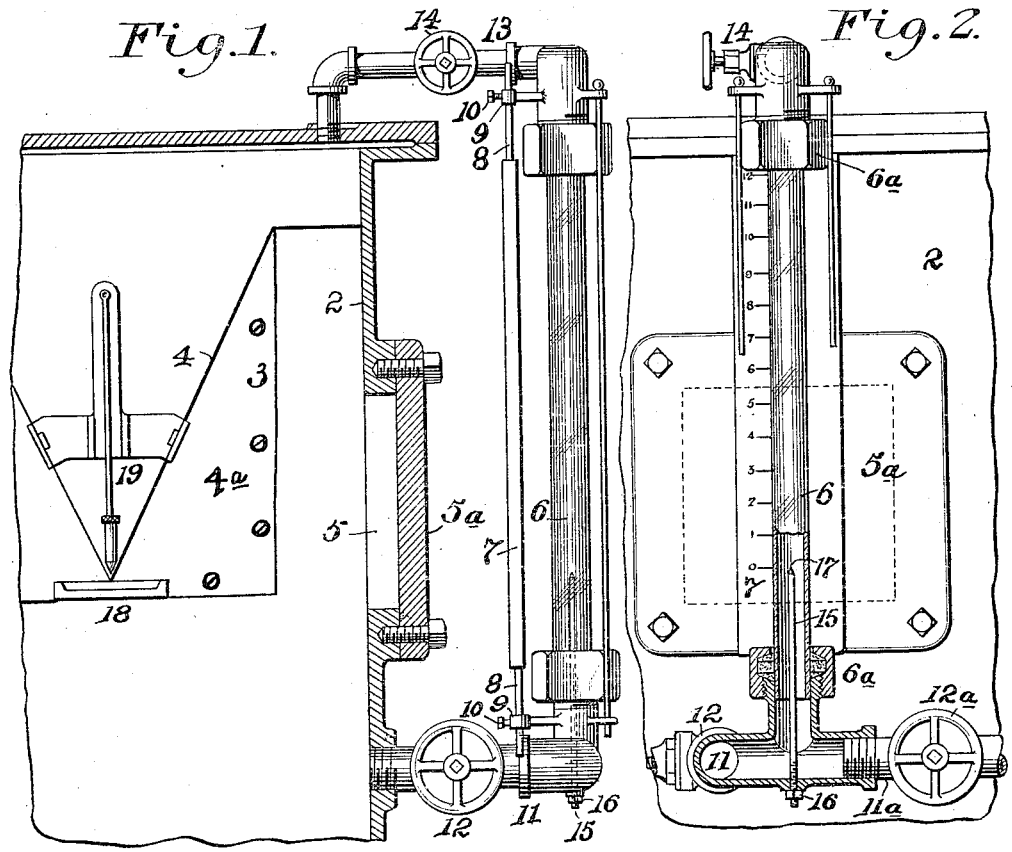
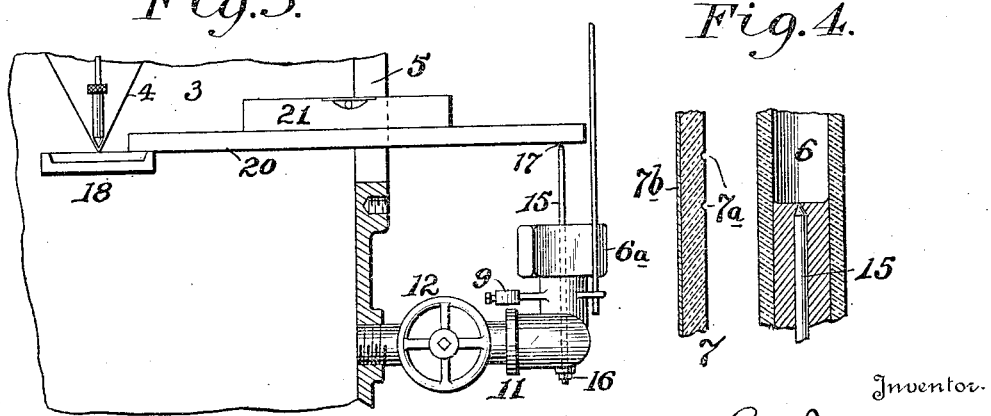
Inventor
Edward G. Jay, Jr.
By 
Attorney

UNITED STATES PATENT OFFICE.

EDWARD G. JAY, JR., OF PHILADELPHIA, PENNSYLVANIA, ASSIGNOR TO WARREN WEBSTER & COMPANY, A CORPORATION OF NEW JERSEY.

METHOD OF SETTING METERS AND MEANS THEREFOR.

1,271,901.  Specification of Letters Patent.  Patented July 9, 1918.

Application filed August 4, 1917. Serial No. 184,507.

*To all whom it may concern:*

Be it known that I, EDWARD G. JAY, Jr., citizen of the United States, and resident of Philadelphia, county of Philadelphia, and State of Pennsylvania, have invented an Improvement in Methods of Setting Meters and Means Therefor, of which the following is a specification.

The object of my invention is to provide a meter of the character adapted for measuring continuous flow of water, with simple and accurate means for establishing and maintaining a true relationship between the measuring instrument and the surface of the liquid within the meter when at a level corresponding to absolute zero.

My invention has for a further object, facility for checking the zero setting, whereby great accuracy may be insured by repeated testing, made possible by reason of the nature of the setting devices embodying my improvements.

In erecting or installing V-notch weir meters in conjunction with feed water heaters or otherwise, it becomes necessary to provide a gage to indicate the level of the water flowing from the V-notch, and it is manifest that this gage must be mechanically "set" for accurate reading after the meter has been installed. It is the function of my invention to provide convenient and effective means for insuring the "setting" of the gage and its scale to provide accurate reading of the water level flowing through the weir within the inclosing case, the said means being easily reset from time to time to check the previous "setting" and thereby compensate for or correct any defect due to setting of the meter unevenly.

My object is further to provide, as part of the means for "setting" the meter gage, a water gage having an adjustable water level indicating point and an adjustable scale formed of a thick glass mirror having upon its clear face a scale marking, whereby there are three points in horizontal alinement to insure accuracy in setting of the gage, namely, the point in the glass gage, the scale on the face of the glass of the mirror and the reflection of the scale in the mirror surface, thereby not only permitting the gage point to be accurately set with the absolute zero of the V-notch, but insuring the setting of the scale in horizontal alinement with the level indicating point, the result of this being, that in looking across the point and scale, into the mirror beyond, the scale and the vision of the eye are adjusted vertically until the point corresponding to the zero of the scale and the reflection of that part of the scale are brought into alinement, thereby insuring the right adjustment of the scale for accurate reading of the water level.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

Referring to the drawings, Figure 1 is a cross section through a portion of the meter chamber adjacent the V-notch and embodying my invention; Fig. 2 is a side elevation of the same, with part in section; Fig. 3 is a sectional view corresponding to a portion of Fig. 1, but illustrating the method of adjusting the indicating point of the water gage; and Fig. 4 is a sectional elevation of the parts adjacent the gage and scale therefor.

2 is the meter case or tank and, as is customary, in V-notch meters, is provided with a transverse partition or dam 3 having the V-notch weir 4 through which the water to be measured flows, said water passing from the intake chamber into the well or storage compartment on the outboard side of the apparatus. It is essential to the proper operation of the registering and recording devices of the meter that the absolute zero level of the water at the notch be determined, so that when this is done, the registering and recording devices may also be "set" or adjusted to the zero point. That this is necessary for accuracy is manifest from the fact that the registering and recording devices are controlled by the movement of a float actuated by the water in the receiving chamber prior to flowing through or over the V-notch weir. It is the special function of my improvements, that the necessary adjustments for "setting" the gage for absolute zero be accomplished with convenient facility, and that the result shall be accurate; and I will now proceed to describe the manner and means by which I secure these results.

The casing 2 is provided at its side, adjacent to the dam 3 having the weir notch 4, with a man-hole 5 fitted with a detachable cover plate 5a, by which access to the interior may be had as hereinafter described. Immediately outside of the meter case and in front of the man-hole 5, I provide a water gage 6 which, in general, may be of the usual construction, said gage connected at the top with the casing 2 above the water level and connected at the bottom with the casing 2 below the water level therein. As shown, this gage comprises a glass tube 6, secured to top and bottom stuffing-box fittings 6a, the top box fitting being connected by pipe 13 with the upper part of casing 2 and the bottom box fitting connected by pipe 11 with the casing below the bottom of the notch weir 4. These pipe connections 11 and 13 are respectively provided with suitable valves 12 and 14 for convenience in replacing a broken gage glass without stopping the operation of the meter. The lower fitting is T-shaped, one branch leading by pipe 11 to the meter casing on the receiving chamber side of the dam 3, and the other branch connected to the outboard discharge pipe 11a and having valve 12a by which the receiving chamber may be drained down to the exact tip 17 of the pointer 15 of the gage as hereinafter described. Extending up through the bottom fitting 6a is the pointer rod 15, the same being screw-threaded at the bottom where it passes through the fitting body, thereby permitting of vertical adjustment. When adjusted this pointer 15 is locked fast by the lock nut 16. The upper end of the rod 15 is pointed as at 17 to give an accurate point for setting of the apparatus and for permitting accurate sight reading, as indicated in Fig. 4. The gage is further provided with an indicator mirror 7 of thick glass having at its back the mirrored surface 7b and upon its clear face an engraved or etched scale 7a (Fig. 4). This mirror scale 7 is provided at top and bottom with rods 8 which are extended through guide arms 9 and clamped in adjusted position by set screws 10. By this means the scale may be adjusted vertically to suit the adjustment of the zero pointer 15 after the latter has been adjusted, that is to say, the scale may be adjusted so that its zero is on a level with the point 17 of the zero pointer. This adjustment may be made with accuracy by sighting from the top of the pointer to the engraved scale and carrying the sight through the glass of the mirror to the reflection of the graduation upon the coated or reflecting surface of the mirror. This will give what may be termed a three-point sight, and is of considerable accuracy. The apparatus having been thus adjusted, any variation in the level of the water flowing over the V-notch 4 may be noted by taking momentary sights of the water level in the glass gage 6 against the graduated height of the scale and its reflection in the manner above explained.

I will now describe the steps taken in "setting" the meter for determining the absolute zero. The preliminary adjustments of the meter are usually made in the shop before shipment to the place of use, and therefore resetting for accuracy alone is necessary. When the apparatus is set on its foundation, the man-hole cover plate 5a is removed from the weir chamber. A spirit level is placed across the leveling strips 18 attached to the notch plate 4a. When this is done, the tank or casing 2 is wedged up on its foundation until the notch 4 is plumb. If the notch is in a separate plate 4a bolted in position upon the dam plate 3 as is sometimes done, adjustment may be had to some extent by separately adjusting the plate as is customary. The plumbing device 19 may be employed in setting the notch plumb, if so desired. These adjustments may be made with the top of the casing removed or access to the interior of the casing may be had for the preliminary leveling operation, for at that time there is no water in the apparatus.

When this preliminary leveling of the tank and notch has been done, the plumb level 19 is removed and the next step is to set the gage for the absolute zero of the notch. The glass 6 and mirror 7 of the gage being removed, a straight edge bar 20 is laid across from the zero pointer top 17 and the leveling strips 18 attached to the notch dam plate 3, and a spirit level 21 is laid upon the bar, as indicated in Fig. 3. As the bottom of the bar is in a horizontal line with the top of the zero pointer and bottom of the V-notch 4, it will be manifest that a true leveling of these may be assured. If the level 21 is of sufficient length, it may rest directly upon the parts 17 and 18 and dispense with the auxiliary level strip or straight edge 20. The pointer 15 is screwed up or down until the spirit level 21 is perfectly level and when this adjustment is had, the lock nut 16 is tightened. This is all the adjustment required depending upon the inside of the meter casing. The manhole cover 5ª is then replaced. The mirror and scale 7 are then adjusted vertically in guides 9 until the sight across tip 17 of pointer 15 to zero graduation on scale 7ª includes the reflection thereof on mirror surface 7ᵇ, and then fixed by tightening set screws 10. This finishes the mechanical adjustment of the meter and all this is done before water is admitted. If the tank should not settle so as to throw the notch out of plumb, the adjustment of the pointer and mirror scale should never be changed. If for any reason the pointer 15 has been removed, it may be readjusted from the mirror scale, as we have in this the scale and its reflection as a means of insuring accurate setting of the pointer. The general details of the glass gage fittings are not material, so long as they provide the improvements in the pointer and scale above described.

The next operation to be carried out may be described as follows: Close all valves 12, 12ª and 14 of the gage and run water through the meter and its notch for approximately twenty minutes to float out the dirt and to insure hot water being present. The flow over the notch 4 is to continue after closing off the meter inlet to gradually lower the water level in the receiving chamber. After shutting off the supply at the inlet, the valves 14 and 12 of the gage are opened in the order named, and the height of the water flowing over the weir notch will be indicated and gradually fall. The fall of the water level will not drop to exact zero owing to surface tension in the notch. The discharge valve 12ª is then opened carefully to lower the water line to the exact tip 17 of the pointer, when the valve is again tightly closed. The adjustment of the registering and recording instrument is then made for the absolute zero level of its float, and thereafter will register and record accurately for all water flowing through the weir. The registering and recording instrument is not shown, as its use in meters of this character is well known.

The great advantage of this improved method of establishing the zero on any V-notch weir is apparent, when it is considered that the actual mechanical "setting" is made before water is admitted to the meter and after which the registering and recording instrument is "set". Hot water under working conditions and temperature may be employed in "setting" the registering and recording instrument to zero; and it is obvious that any meter for measuring hot water should, for accuracy, be adjusted under working temperature because of the variation in density of water at different temperatures and its effect upon the float device of the registering and recording instrument.

By the construction of this apparatus, it is possible to check the zero "setting" frequently and with great accuracy. While a V-notch weir meter requires less attention than any other type, it is expected to give good results and will do so for many years, if checked occasionally by the simple means here provided. The operator is thus assured of the continued accuracy of the apparatus upon which the economical operation of the plant is largely dependent.

My invention not only comprehends the means described, but also the method by which the absolute zero may be determined in the gage without the necessity for any adjustments or reading of instruments within the meter at a time when the water conditions as to temperature are required. All who have experienced the setting of meters as heretofore carried on, are aware of the difficult and unpleasant undertaking, which invariably leaves the impression that perhaps the results were not as accurate as the precision of the apparatus demanded. Furthermore, it is a well known fact that there is likely to be a variation between the actual zero at the notch and the corresponding position of the registering and recording instrument float at any moment while in operation, because a V-notch register is an averaging instrument. The momentary reading is approximate, while the average will be correct well within any commercial guarantee required. It is obvious that any so-called "head" scale on a recording mechanism will be in error to some extent, making it impossible to check a meter by means of such a scale used with V-notch formulæ. The only place on a meter tank where accurate "head" readings may be obtained is directly at the weir. The improvement here described enables accurate adjustment based upon the readings taken directly adjacent the weir. By my improved apparatus, the most accurate results may be obtained in "setting" the meter and without the necessity for the operating man to crawl into hot, uncomfortable positions, sometimes exposing him to actual dangers from scalding, that he may adjust his instrument with hot water, this being necessary in the practice as heretofore carried on.

It will be seen that with my improved apparatus and method the entire operations may be done in a satisfactory manner; and in "setting" the registering and recording instrument, the operator is wholly outside of the meter tank. Frequent checking tests may therefore be made without difficulty or interference with the normal operation of the apparatus.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In means for "setting" a meter of the character stated, the combination with a tank having therein a V-notch weir, and a leveling strip adjacent the bottom of the notch and also having a man-hole in its side in horizontal alinement with the leveling surface of the strip, of a glass water gage at the outside of the tank in alinement with the man-hole and leveling strip and having top and bottom fittings respectively in communication with the tank above and below the V-notch weir therein, a pointer rod adjustably secured in the bottom fitting and extending upward within the glass gage and with its upper end in horizontal alinement with the bottom of the weir notch and leveling strip, and a mirror scale adjustably secured to the gage fittings, said mirror scale being arranged vertically with the reflecting surface facing the glass gage and with the clear surface thereof provided with a scale which is reflected in the mirror to give with the pointer a three-point sight.

2. In means for "setting" a meter of the character stated, the combination with a tank having therein a V-notch weir, and a leveling strip adjacent the bottom of the notch and also having a man-hole in its side in horizontal alinement with the leveling surface of the strip, of a tubular glass water gage at the outside of the tank in alinement with the man-hole and leveling strip and having top and bottom fittings respectively in communication with the tank above and below the V-notch weir therein, a pointer rod adjustably secured in the bottom fitting and extending upward within the glass gage and with its upper end in horizontal alinement with the bottom of the weir notch and leveling strip, and a mirror scale of thick glass adjustably secured to the gage fittings, said mirror scale being arranged vertically parallel with the gage tube with the reflecting surface on one side of the glass facing the glass gage through the glass and with the clear surface thereof provided with a scale separated from the reflecting surface whereby the scale is reflected in the mirror to give with the pointer a three-point sight.

3. In means for "setting" a meter of the character stated, a gage comprising a vertical glass tube, top and bottom fittings respectively in communication with the meter casing above and below its water level, a pointer rod adjustably supported within the glass tube from the bottom fitting, and a mirror scale of thick glass adjustably secured to the gage and supported parallel to the gage tube, said mirror scale having its surface adjacent the glass gage tube provided with scale markings and its surface most distant from the gage tube and immediately back of the scale markings provided with a reflecting material, whereby a three-point sight may be obtained.

4. In means for "setting" a meter of the character stated, a gage comprising a vertical glass tube, top and bottom fittings respectively in communication with the meter casing above and below its water level, a pointer rod adjustably supported within the glass tube from the bottom fitting, a mirror scale of thick glass adjustably secured to the gage and supported parallel to the gage tube, said mirror scale having its surface adjacent the glass gage tube provided with scale markings and its surface most distant from the gage tube and immediately back of the scale markings provided with a reflecting material, whereby a three-point sight may be obtained, means in each of the fittings for controlling communication with the meter tank, and separate means for lowering the water level in communication with the lower fitting.

5. In means for "setting" a V-notch weir meter, the combination of a tank having a V-notch and a leveling strip at the bottom of the V-notch and also having a man-hole in its side in horizontal alinement with the leveling surface of the strip, a removable cover plate for the manhole, a glass gage on the outside of the meter in alinement with the man-hole and leveling strip and having a removable and vertically adjustable mirror scale having on one face a scale marking and on the other a reflecting material, a vertically adjustable pointer rod extending upward within the glass gage to indicate the zero of the V-notch of the meter, a removable straight edge resting upon the leveling strip and the top of the pointer rod and having a level indicating means, separate tubular connections extending from the top and bottom of the glass gage to the meter tank at points respectively above and below the water level therein, and means to control the tubular connections.

6. In means for "setting" a meter of the character stated, a glass gage on the outside of the meter casing comprising a tubular glass water column in communication with the casing, a pointer rod extending within the tubular glass water column to indicate the zero setting of the weir of the meter, and means for providing two scales of the same character in parallel alinement with the tubular water column and in the same transverse alinement with the pointer rod, to provide a "three-point" sight.

7. In means for "setting" a meter of the character stated, the combination of the meter casing, with a tubular glass water gage, top and bottom tubular metal fittings respectively for communication with the meter casing above and below the water level therein for detachably holding the glass tube, a pointer rod adjustably connected with and extending up through the bottom fitting and into the glass tube, a mirror scale arranged parallel to the glass tube having a reflecting surface on its side most distant from the glass tube and a scale upon its surface adjacent to the said tube and between it and the reflecting surface, and vertically adjustable connections at top and bottom of the mirror scale for supporting it from the top and bottom fittings.

8. In means for "setting" a meter of the character stated, the combination of the meter casing, with a tubular glass water gage, top and bottom tubular metal fittings respectively for communication with the meter casing above and below the water level therein for detachably holding the glass tube, a pointer rod adjustably connected with and extending up through the bottom fitting and into the glass tube, a mirror scale arranged parallel to the glass tube having a reflecting surface on its side most distant from the glass tube and a scale upon its surface adjacent to the said tube, vertically adjustable connections at top and bottom of the mirror scale for supporting it from the bottom fittings, valves in the top and bottom fittings between the glass tube and the meter casing, and a valved drainage passage from the bottom fitting for controllably draining the water from the casing through the bottom fitting to regulate the water level with respect to the top of the pointer.

9. The herein described method of "setting" a weir meter, which consists in opening the side of the meter tank between the bottom of the weir and water gage on the outside of the tank, removing the glass tube of the gage, adjusting the pointer of the gage to an exact level with the bottom of the weir by use of leveling devices extending through the opening in the meter tank, removing the leveling devices and sealing the tank opening, inserting the glass tube of the gage to inclose the pointer, adjusting a mirror scale adjacent to the glass tube and pointer rod to give a three-point sight corresponding to the top of the pointer rod, causing water to flow through the meter to give to it normal conditions as to temperature, shutting off the supply of water to the meter and drawing off the water until the level of water in the tube of the gage is exactly on a level with the top of the pointer rod to determine the absolute zero of the notch or weir of the meter, and then adjusting the usual registering and recording devices to zero with respect to the zero water level of the water in the meter.

In testimony of which invention, I hereunto set my hand.

EDWARD G. JAY, Jr.

Witnesses:
  E. W. SMITH,
  R. E. SMITH.

Copies of this patent may be obtained for five cents each, by addressing the "Commissioner of Patents, Washington, D. C."